US012304865B2

(12) United States Patent
Mudgal et al.

(10) Patent No.: US 12,304,865 B2
(45) Date of Patent: May 20, 2025

(54) DEVELOPMENT OF ALCOHOLIC SUCROSE-BASED SUPERPLASTICIZER FOR GEO-POLYMERIC CONCRETE AND ITS PROCESS THEREOF

(71) Applicant: Council of Scientific and Industrial Research, New Delhi (IN)

(72) Inventors: Manish Mudgal, Bhopal (IN); Anil Kumar, Bhopal (IN); Ramesh Kumar Chouhan, Bhopal (IN); Archana Singh, Bhopal (IN); Avanish Kumar Srivastava, Bhopal (IN)

(73) Assignee: Council of Scientific and Industrial Research, New Delhi (IN)

( * ) Notice: Subject to any disclaimer, the term of this patent is extended or adjusted under 35 U.S.C. 154(b) by 493 days.

(21) Appl. No.: 17/657,249

(22) Filed: Mar. 30, 2022

(65) Prior Publication Data
US 2022/0315490 A1    Oct. 6, 2022

(30) Foreign Application Priority Data
Mar. 31, 2021    (IN) .............................. 202111015507

(51) Int. Cl.
*C04B 28/06*    (2006.01)
*C04B 14/06*    (2006.01)
(Continued)

(52) U.S. Cl.
CPC .......... *C04B 28/006* (2013.01); *C04B 14/068* (2013.01); *C04B 18/021* (2013.01);
(Continued)

(58) Field of Classification Search
CPC ... C04B 28/006; C04B 14/068; C04B 18/021; C04B 18/08; C04B 18/146;
(Continued)

(56) References Cited

U.S. PATENT DOCUMENTS

| 10,023,497 B2 | 7/2018 | Amritphale et al. |
| 2014/0264140 A1* | 9/2014 | Gong .................... C04B 28/006 106/676 |
| 2020/0031717 A1* | 1/2020 | Gong .................... C04B 28/021 |

OTHER PUBLICATIONS

Assi et al. Using sucrose for improvement of initial and final setting times of silica fume-based activating solution of fly ash geopolymer concrete. Construction and Building Materials, vol. 191, pp. 47-55. (Year: 2018).*

(Continued)

*Primary Examiner* — Bryan D. Ripa
*Assistant Examiner* — Anastasia A. Kuvayskaya
(74) *Attorney, Agent, or Firm* — Workman Nydegger

(57) ABSTRACT

A geo-polymeric concrete and a process for preparing the geo-polymeric concrete is disclosed. The geo-polymeric concrete includes class F fly ash in a range from 10-20 wt %, of the design mix river sand in a range from 25-40 wt % of the design mix, a natural aggregate in a range from 15 to 40 wt % of the design mix, silica fume in a range from 1 to 2 wt % of class F fly ash, an alkaline activator solution and a superplasticizer in a range from 0.5 to 3 wt %. The materials used for preparing the superplasticizer are easily available in the market in abundance at a reasonable cost. The superplasticizer is economically viable and improves the workability of the geo-polymeric concrete. The presence of the superplasticizer does not affect the compressive strength of the geo-polymeric concrete.

13 Claims, 1 Drawing Sheet

(51) Int. Cl.
  *C04B 18/02* (2006.01)
  *C04B 18/08* (2006.01)
  *C04B 18/14* (2006.01)
  *C04B 22/06* (2006.01)
  *C04B 24/02* (2006.01)
  *C04B 24/10* (2006.01)
  *C04B 28/00* (2006.01)
  *C04B 103/10* (2006.01)
  *C04B 103/32* (2006.01)

(52) U.S. Cl.
  CPC ............ *C04B 18/08* (2013.01); *C04B 18/146* (2013.01); *C04B 22/062* (2013.01); *C04B 24/02* (2013.01); *C04B 24/10* (2013.01); *C04B 2103/10* (2013.01); *C04B 2103/32* (2013.01); *C04B 2201/52* (2013.01)

(58) Field of Classification Search
  CPC ....... C04B 22/062; C04B 24/02; C04B 24/10; C04B 2103/10; C04B 2103/32; C04B 2201/52; Y02W 30/91
  See application file for complete search history.

(56) References Cited

OTHER PUBLICATIONS

Pannetier et al. A comparative rheological study of lime/molasses and sucrose/lime/water mixtures in the presence of additives, Applied Rheology, 10, 5, pp. 238-247. (Year: 2000).*

Abdullah et al. The relationship of NaOH molarity, Na2SiO3/NaOH ratio, fly ash/alkaline activator ratio, and curing temperature to the strength of fly ash-based geopolymer, Advanced Materials Research, vols. 328-330, pp. 1475-1482. (Year: 2011).*

S. A. Arafa et al., "Optimum Mix for Fly Ash Geopolymer Binder Based on Workability and Compressive Strength", IOP Conf. Series: Earth and Environmental Science, 140, 2018, doi :10.1088/1755-1315/140/1/012157.

P. Chindaprasirt et al., "Workability and Strength of Coarse High Calcium Fly Ash Geopolymer", Science Direct, Cement & Concrete Composites, 29, Dec. 27, 2006, 224-229.

R. K. Chouhan et al., "Rice-husk-based Superplasticizer to Increase Performance of Fly Ash Geopolymer Concrete", Emerging Materials Research, Jan. 8, 2018, https://doi.org/10.1680/jemmr.18.00035.

S. Nagajothi et al., "Parametric Studies on the Workability and Compressive Strength Properties of Geopolymer Concrete", Journal of the Mechanical Behavior of Materials, Sep. 17, 2018, DOI: 10.1515/jmbm-2018-0019.

* cited by examiner

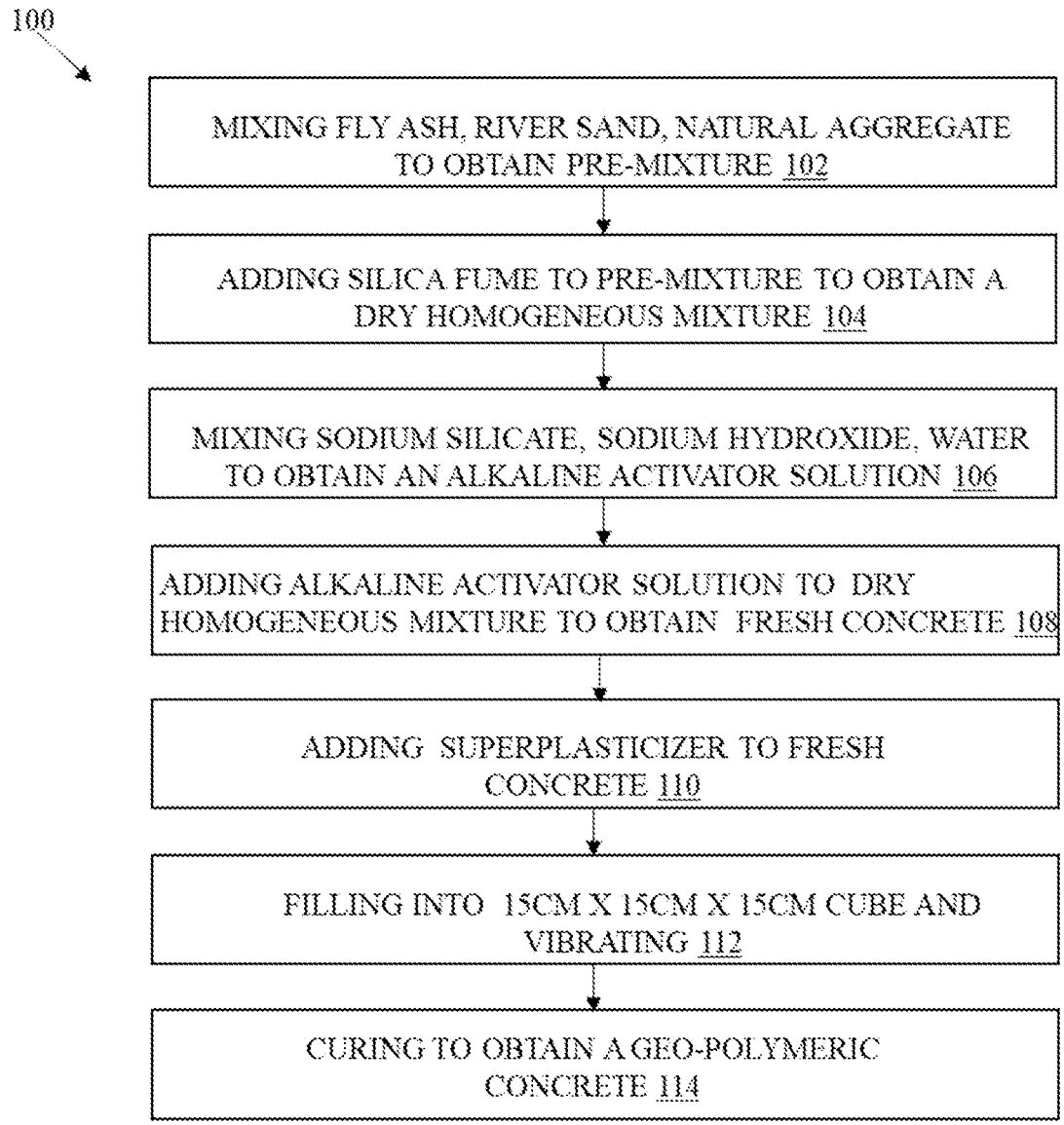

DEVELOPMENT OF ALCOHOLIC SUCROSE-BASED SUPERPLASTICIZER FOR GEO-POLYMERIC CONCRETE AND ITS PROCESS THEREOF

CROSS-REFERENCE TO RELATED APPLICATIONS

This application claims the benefit of and priority to IN Provisional Patent Application No. 202111015507, filed Mar. 31, 2021, the entire disclosure of which is hereby incorporated by reference as if set forth in its entirety herein

TECHNICAL FIELD

The present application relates generally to an alcoholic sucrose-based superplasticizer, and more particularly but not exclusively, to a superplasticizer used for preparing geo-polymeric concrete.

BACKGROUND

Geopolymer is an advanced type of binder and is produced by the reaction of alumino-silicate oxides ($Al_2O_2$, $Si_2O_5$) with alkali polysilicates known as polymeric Si—O—Al bonds. Geopolymer possess a high viscosity that adversely affects the flow property of the geopolymeric concrete. Flowability affects the properties which is a key factor in civil engineering applications.

Alkaline activator is necessary for the geopolymerization reaction. Many studies indicate that alkalinity takes an active part in the strength of the geopolymer. Studies were carried out to improve the workability of the geo-polymer concrete by optimizing a ratio of alkalinity and fly ash in the geopolymer concrete. The alkaline activator plays an important role to decide the rate of the polymerization in the geo-polymeric matrix. However, the use of alkaline solution increases the viscosity of the geo-polymeric concrete and ultimately affects the flowability.

Further studies were carried out to study various properties of the geo-polymeric concrete including workability using high calcium-based fly ash. It was reported that calcium does not take participate in the polymerization, instead it blocks the chain of the polymerization. This may be a drawback for geo-polymeric concrete and may be responsible for the low compressive strength.

In yet another study rice-husk-based super-plasticizer was used to increase the performance of the geo-polymeric concrete. However, development of rice husk-based super-plasticizer involves a tedious synthesis process and may not be scaled up.

In a further study, ground granulated blast furnace slag (GGBFS) was used for the workability enhancement. However, GGBFS has its own drawback due to its high content of the calcium, which may not be suitable for durability and strength of the geo-polymeric concrete. As mentioned earlier, high concentration of calcium is not favorable for the synthesis of geo-polymeric synthesis, especially in the fly ash-based geopolymer.

In yet another study, the workability of the geo-polymeric concrete was improved by using rice husk and sodium hydroxide. In this study, a tedious method has been used for the synthesis. However, it was reported that the compressive strength decreased with increasing amount of the superplasticizer.

Thus, there is a need for a cost-effective component that can be produced at bulk level, and when added may significantly improve the workability of the geo-polymeric concrete.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

According to one aspect, embodiments relate to a geo-polymeric concrete. The geo-polymeric concrete has class F fly ash in a range from 10-20 wt % of the design mix, river sand in a range from 25-40 wt % of the design mix, a natural aggregate in a range from 15 to 40 wt % of the design mix, silica fume in a range from 1 to 2 wt % of class F fly ash, an alkaline activator solution and a superplasticizer in a range from 0.5 to 3 wt %.

In some embodiments the superplasticizer has an alcoholic sucrose solution.

In some embodiments the superplasticizer has about 17 ml of commercial grade ethyl alcohol and 60 g of sucrose in 100 ml water.

In some embodiments the alkaline activator solution has 16 M sodium hydroxide and sodium silicate in water.

In some embodiments the natural aggregate has a size in a range from 6 mm to 20 mm.

In some embodiments the alkaline activator solution has a pH in a range from 13-14.

In some embodiments the geo-polymeric concrete has a compressive strength in a range from 50 to 70 MPa with a workable slump in a range from 0 to 190 mm after 28 days curing.

In some embodiments the geo-polymeric concrete with zero superplasticizer has a workability in a range from 0-10 mm slump with a compressive strength in a range from 59 to 62 MPa after 28 days curing.

In some embodiments the geo-polymeric concrete with about 0.8 wt % of superplasticizer has a workability in a range from 0-40 mm slump with a compressive strength in a range from 57 to 60 MPa after 28 days curing.

In some embodiments the geo-polymeric concrete with about 1.6 wt % of superplasticizer has a workability in a range from 0-150 mm slump with a compressive strength in a range from 57 to 60 MPa after 28 days curing.

In some embodiments the geo-polymeric concrete with about 2.4 wt % of superplasticizer has a workability in a range from 0-190 mm slump with a compressive strength in a range from 55 to 59 MPa after 28 days curing.

In another aspect, a process for preparing a geo-polymeric concrete is described. 10-20 wt % of class F fly ash, 25-40 wt % of river sand, and 15 to 40 wt % of a natural aggregate are mixed in a motorized concrete mixer for about 5 to 8 minutes to obtain a pre-mixture. 1 to 2 wt % of silica fume according to the wt % of class F fly ash is added to the pre-mixture to obtain a dry homogeneous mixture. Sodium silicate ($Na_2SiO_3$), sodium hydroxide (NaOH), and water are mixed to obtain an alkaline activator solution. The alkaline activator solution is added to the dry homogeneous mixture for about 5 to 8 minutes to obtain a fresh concrete. 0.5 to 3 wt % of a superplasticizer is added to the fresh concrete and mixed for about 4 to 6 minutes. This is filled into a 15 cm×15 cm×15 cm cube and vibrated for about 3 minutes. It is then cured in a hot air oven at 60° C. for 48 hrs followed by curing at ambient temperature for 28 days to obtain a geo-polymeric concrete.

In some embodiments the preparation of superplasticizer is disclosed. Commercially available sucrose is dissolved in tap water and stirred to obtain a sucrose solution with complete transparency. Commercially available ethyl alcohol to is added the sucrose solution to obtain a mixture. The mixture is stirred to obtain a transparent solution and is left for about 30 minutes to get a crystal-clear superplasticizer.

In some embodiments the alkaline activator solution has a pH in a range from 13-14.

In some embodiments the workability of the geo-polymeric concrete is measured using the slump cone method.

In some embodiments the compressive strength of the geo-polymeric concrete is evaluated after 3, 7, 14- and 28-days of curing.

BRIEF DESCRIPTION OF DRAWINGS

Non-limiting and non-exhaustive embodiments of the invention are described with reference to the following FIGURES, wherein like reference numerals refer to like parts throughout the various views unless otherwise specified.

FIG. 1 is a flow chart illustrating the process for preparing a geo-polymeric concrete in accordance with an embodiment of the present disclosure.

Further, persons skilled in the art to which this disclosure belongs will appreciate that elements in the figures are illustrated for simplicity and may not have necessarily been drawn to scale. Furthermore, in terms of the construction of the device, one or more components of the device may have been represented in the FIGURES by conventional symbols, and the FIGURES may show only those specific details that are pertinent to understanding the embodiments of the present disclosure so as not to obscure the FIGURES with details that will be readily apparent to those of ordinary skill in the art having the benefit of the description herein.

DETAILED DESCRIPTION

For the purpose of promoting an understanding of the principles of the disclosure, reference will now be made to the embodiment(s) illustrated in the figures and specific language will be used to describe them. It will nevertheless be understood that no limitation of the scope of the disclosure is thereby intended. Such alterations and further modifications to the disclosure, and such further applications of the principles of the disclosure as described herein being contemplated as would normally occur to one skilled in the art to which the disclosure relates are deemed to be a part of this disclosure.

It will also be understood by those skilled in the art that the foregoing general description and the following detailed description are exemplary and explanatory of the disclosure and are not intended to be restrictive thereof.

The terms "comprises," "comprising," or any other variations thereof, are intended to cover a non-exclusive inclusion, such that a process or method that comprises a list of steps does not include only those steps but may include other steps not expressly listed or inherent to such a process or a method. Similarly, one or more devices or sub-systems or elements or structures or components preceded by "comprises . . . a" does not, without more constraints, preclude the existence of other devices, other sub-systems, other elements, other structures, other components, additional devices, additional sub-systems, additional elements, additional structures, or additional components. Appearances of the phrase "in an embodiment," "in another embodiment" and similar language throughout this specification may, but do not necessarily, all refer to the same embodiment.

Unless otherwise defined, all technical and scientific terms used herein have the same meaning as commonly understood by one of ordinary skill in the art to which this disclosure belongs. The system, methods, and examples provided herein are illustrative only and not intended to be limiting.

Embodiments of the present disclosure will be described below in detail with reference to the accompanying FIGURES.

Geo-polymeric concrete possesses high viscosity and thereby has low workability. Efforts have been made to improve the workability of the geo-polymeric concrete. Existing techniques have drawbacks, such as tedious synthesis process, and poor compatibility with geo-polymeric concrete. Further, the reported techniques are difficult to scale up to an industrial level. The present disclosure describes a user-friendly superplasticizer, which is developed using a mixture of sucrose and ethyl alcohol. Importantly, both the components are commercially available in the market in bulk. Moreover, a high purity of the raw materials is not required for the development of the superplasticizer. The superplasticizer provides high amount of hydroxyl group in the matrix, which enhance the workability without decreasing the mechanical properties in the geo-polymeric concrete.

The superplasticizer developed is economically viable, commercially available material and significantly improves the workability of the geopolymeric material with high reproducibility and on short time scale. All components of the developed superplasticizer (sucrose and alcohol) are easily available in the market in abundance at a reasonable cost. The state of the art of this material is that the superplasticizer does not affect the compressive strength of the geo-polymeric concrete.

As the workability is a well-known problem for the fly ash-based geo-polymeric concrete, the present work demonstrates the development of a novel and simple alcoholic sucrose-based superplasticizer, which is commercial, easy to procure, is non-toxic and easy to handle. In an embodiment of the present invention, initially, a definite ratio of sucrose (commercially available and of any purity) was mixed with water followed by continuous stirring until a transparent solution was obtained. To this transparent solution ethyl alcohol (commercially available and of any purity) was added and again mixture was thoroughly stirred. Natural aggregates of size 20, 10, 6 mm were used for the development of geo-polymeric concrete. However, fly ash (class F), sodium hydroxide, sodium metasilicate, and silica fume were further mixed into the motorized mixer. Finally, an alcoholic sucrose solution used for the workability enhancement in a different wt % of the fly ash was added to the above mixture.

In an embodiment, a reference batch was made with high molar concentration of sodium hydroxide. When compared to the reference batch with zero superplasticizer, the present disclosure achieved a slump of 150 to 180 mm around ~58 MPa. This is unique for different construction materials. The superplasticizer is cost-effective, environment-friendly, non-toxic, and earth-abundant.

The process may be briefly explained where an alkaline activator solution was prepared using sodium hydroxide, sodium metasilicates and water. Whereas sodium hydroxide molarity was taken around ~16M for geopolymer activation for reference batch. Silica fume, fly ash, 20, 10, 6 mm aggregate, and sand were taken together in a motorized concrete mixer for homogeneous mixing. In the next step, the alkaline activator solution was added step by step and mixed for further five minutes followed by addition of required quantity of the superplasticizer. Finally, after mixing properly the material was transferred in a tray and slump was measured using the slump cone method. This fresh concrete was compacted using a vibration table for 2-4 minutes in the 15×15×15 cm cube. However, workability enhanced as the concentration of superplasticizer increased in the matrix. Curing of these samples was done in a hot air oven having dimensions of 605×910×910 mm for 48 hrs. at 60° C. The compressive strength was determined after 3, 7, 14, and 28 days using hydraulic digital compression testing machine.

As shown in FIG. 1, the process 100 is for preparing a geo-polymeric concrete in accordance with an embodiment of the disclosure. At step 102, 10-20 wt % of class F fly ash, 25-40 wt % of river sand, and 15 to 40 wt % of a natural aggregate are mixed in a motorized concrete mixer for about 5 to 8 minutes to obtain a pre-mixture. At step 104, 1 to 2 wt % of silica fume according to the wt % of class F fly ash is added to the pre-mixture to obtain a dry homogeneous mixture. Sodium silicate ($Na_2SiO_3$), sodium hydroxide (NaOH), and water are mixed to obtain an alkaline activator solution at step 106. At step 108, the alkaline activator solution is added to the dry homogeneous mixture for about 5 to 8 minutes to obtain a fresh concrete. Step 108 is followed by step 110, where 0.5 to 3 wt % of a superplasticizer is added to the fresh concrete and mixed for about 4 to 6 minutes. At step 112, the fine concrete mixed with the superplasticizer is filled into a 15 cm×15 cm×15 cm cube and vibrated for about 3 minutes. It is then cured in a hot air oven at 60° C. for 48 hrs followed by curing at ambient temperature for 28 days to obtain a geo-polymeric concrete at step 114.

The following examples are given by way of illustration and therefore should not be construed to limit the scope of the present disclosure.

Example 1

Preparation of Reference Batch

The geo-polymeric concrete was synthesized by using an alkaline activator solution. The alkaline activator solution was prepared using sodium silicate ($Na_2SiO_3$) and 16 M sodium hydroxide (NaOH). For the design mix, oven dry coarse aggregate, i.e., 24 kgs having a size of 20 mm and 36 kg having a size of 10 mm were used for making the geo-polymeric concrete. 37.2 kg of river sand was used as a fine aggregate. The raw materials were mixed in the motorized concrete mixer for about 5 to 8 minutes and 2% silica fume was added according to wt. % of the fly ash. Finally, 16M alkaline activator solution (NaOH, sodium silicate, and water) was added and allowed to mix for the next 5 to 8 minutes. The fresh geo-polymeric concrete was poured into a tray to measure the workability using the slump cone method. The fresh geo-polymeric concrete was filled into a (15 cm×15 cm×15 cm) cube and vibrated for 3 minutes. It was kept in an oven at 60° C. for 48 hrs for curing followed by room temperature curing for further 28 days. Compressive strength was evaluated after 3, 7, 14- and 28-days of curing. A density of 2.52 g/cc was observed after 3 days curing, while a maximum strength of ~62 MPa was observed for the 28 days curing with 0-10 slump. This sample was a referred to as a reference batch.

Example 2

Preparation of Superplasticizer 60 g commercially available sucrose was dissolved in 100 ml tap water and stirred till complete transparency. 17 ml of commercially available ethyl alcohol was added to the sucrose solution. The mixture was stirred till a transparent solution was achieved. The solution was left for 30 minutes till it became crystal clear. The transparent alcoholic sucrose solution is the superplasticizer, which was used for the workability enhancement of the geo-polymeric concrete.

Example 3

Experiment 1

150 ml (0.8% of fly ash) of alcoholic sucrose (superplasticizer) was added in the same design mix of geo-polymeric concrete as explained in example 1. The superplasticizer was added after the addition of alkaline activator solution and further mixed for the next 4 to 6 minutes. Other conditions were same as that of example 1. After adding 0.8% (wt % of used fly ash) superplasticizer in the design mix shown in example 1, a 40-60 mm slump was observed for different batches. The fresh concrete thus prepared was poured in the (15 cm×15 cm×15 cm) cube and vibrated for 4 minutes. The samples were cured at a temperature of 60° C. for 48 hrs. in an electric oven and then at ambient temperature for further 28 days. These cured samples were tested for compressive strength after 1, 3, 7 and 28-days curing. A maximum compressive strength of ~60 MPa was achieved after 28 days curing.

Example 4

Experiment 2

300 ml (1.6% of fly ash) of superplasticizer (as prepared in example 2) was added in the same design mix as in example 1. The superplasticizer was added after the addition of the alkaline activator solution and other conditions were maintained same as example 1. It was observed that on the addition of 1.6% superplasticizer in the same design mix, a slump of 120-150 mm was observed for different batches. A maximum compressive strength achieved ~61 MPa after 28 days curing, which is very close to the reference batch.

Example 5

Experiment 3

A 450 ml (2.4% of fly ash) of superplasticizer was added for further investigation in the same design mix as explained in example 1. On addition of 2.4% superplasticizer, a slump of 170-190 mm was observed for different batches. A maximum compressive strength was achieved ~59 MPa after 28 days curing. A marginal decrease in the compressive strength was observed.

Example 6

Experiment 4

Superplasticizer without Ethyl Alcohol 180 g commercially available sucrose was dissolved in 300 ml water and stirred the solution till complete transparency. The solution was added to the design mix in similar conditions as in example 1. The slump of 145-170 mm was observed, which is close to the results obtained for 1.7% superplasticizer in example 2. However, the compressive strength was only ~43 MPa after 28 days curing. This clearly indicates that though the slump was good with only sucrose, the compressive strength was poor.

Example 7

Experiment 5

Superplasticizer without Sucrose 51 ml of ethyl alcohol was added to 300 ml of tap water. This was added to the design mix as explained in example 1. The other conditions were the same as example 1. After adding the superplasticizer (without sucrose) in the design mix, a slump of 20-40 mm was observed for the different batches. All conditions and curing temperatures were the same as example 3. However, a maximum compressive strength of 68 MPa was achieved after 28 days curing. This indicates that though the strength increased to 68 MPa, the slum was very poor. Thus, it can be inferred that for the superplasticizer to work efficiently, both sucrose and ethyl alcohol are needed. Both the compressive strength and workability are needed for a good geo-polymeric concrete.

Table 1 compares the effect of different amounts of superplasticizer on slump and compressive strength of the geo-polymeric concrete. It can be clearly seen from the Table 1 that as the amount of superplasticizer increases, the slump increases while maintaining the compressive strength. Further, the superplasticizer with only sucrose or only ethyl alcohol did not meet the requirements of the workability and the compressive strength.

TABLE 1

Effect of superplasticizer on slump and compressive strength

| Sl. No. | Amount of superplasticizer (ml) | Slump (mm) | Compressive Strength (MPa) |
| --- | --- | --- | --- |
| Reference Batch | 0 | 0-10 | ~62 |
| Experiment 1 | 150 (superplasticizer of example 2) | 40-60 | ~60 |
| Experiment 2 | 300 (superplasticizer of example 2) | 120-150 | ~61 |
| Experiment 3 | 450 (superplasticizer of example 2) | 170-190 | ~59 |
| Experiment 4 | 300 (superplasticizer without ethyl alcohol) | 145-170 | ~43 |
| Experiment 5 | 300 (superplasticizer without sucrose) | 20-40 | 68 |

The superplasticizer is suitable for the geo-polymeric concrete, which is non-toxic and easy to handle. For the development of the superplasticizer commercially available material was used and the process does not require any sophisticated facilities. A commercial alcohol/sprit and sucrose may be used for the development of the superplasticizer.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A geo-polymeric concrete comprising:
   class F fly ash in a range from 10-20 wt % of a design mix;
   river sand in a range from 25-35 wt % of the design mix;
   a natural aggregate in a range from 20 to 45 wt % of the design mix;
   silica fume in a range from 1 to 2 wt % of class F fly ash;
   an alkaline activator solution; and
   a superplasticizer in a range from 0.5 to 3 wt % of class F fly ash, wherein the superplasticizer comprises about 17 ml of commercial grade ethyl alcohol and 60 g of sucrose in 100 ml water.

2. The geo-polymeric concrete as claimed in claim 1, wherein the alkaline activator solution comprises 16 M sodium hydroxide and sodium silicate in water.

3. The geo-polymeric concrete as claimed in claim 1, wherein the natural aggregate has a size in a range from 6 mm to 20 mm.

4. The geo-polymeric concrete as claimed in claim 1, wherein the alkaline activator solution has a pH in a range from 13-14.

5. The geo-polymeric concrete as claimed in claim 1, wherein the geo-polymeric concrete has a compressive strength in a range from 50 to 65 MPa with a workable slump in a range from 0 to 190 mm after 28 days curing.

6. The geo-polymeric concrete as claimed in claim 1, wherein the geo-polymeric concrete with about 0.8 wt % of superplasticizer has a workability in a range from 0-40 mm slump with a compressive strength in a range from 57 to 60 MPa after 28 days curing.

7. The geo-polymeric concrete as claimed in claim 1, wherein the geo-polymeric concrete with about 1.6 wt % of superplasticizer has a workability in a range from 0-150 mm slump with a compressive strength in a range from 57 to 60 MPa after 28 days curing.

8. The geo-polymeric concrete as claimed in claim 1, wherein the geo-polymeric concrete with about 2.4 wt % of superplasticizer has a workability in a range from 0-190 mm slump with a compressive strength in a range from 55 to 59 MPa after 28 days curing.

9. A process for preparing a geo-polymeric concrete, the process comprising:

mixing 10-20 wt % of class F fly ash, 25-35 wt % of river sand, and 20 to 40 wt % of a natural aggregate in a motorized concrete mixer for about 5 to 8 minutes to obtain a pre-mixture;

adding 1 to 2 wt % of silica fume according to the wt % of class F fly ash to the pre-mixture to obtain a dry homogeneous mixture;

mixing sodium silicate ($Na_2SiO_3$), sodium hydroxide (NaOH), and water to obtain an alkaline activator solution;

adding the alkaline activator solution to the dry homogeneous mixture for about 5 to 8 minutes to obtain a fresh geo-polymeric concrete;

adding 0.5 to 3 wt % of a superplasticizer according to the wt % of class F fly ash to the fresh concrete and mixing for about 4 to 6 minutes, wherein the superplasticizer comprises about 17 ml of commercial grade ethyl alcohol and 60 g of sucrose in 100 ml water;

filling into a 15 cm X 15 cm X 15 cm cube and vibrating for about 3 minutes; and curing in a hot air oven at 60° C. for 48h rs followed by curing at ambient temperature for 28 days to obtain a geo-polymeric concrete.

10. The process as claimed in claim 9, wherein preparing the superplasticizer comprises:

dissolving the sucrose in tap water;

stirring to obtain a sucrose solution with complete transparency;

adding the ethyl alcohol to the sucrose solution to obtain a mixture;

stirring the mixture to obtain a transparent solution and leaving for about 30 minutes to get a crystal-clear superplasticizer.

11. The process as claimed in claim 9, wherein the alkaline activator solution has a pH in a range from 13-14.

12. The process as claimed in claim 9, further comprising measuring workability using a slump cone method.

13. The process as claimed in claim 9, further comprising evaluating compressive strength after 3, 7, 14-and 28-days of curing.

* * * * *